US008391887B2

(12) United States Patent
Suzuki et al.

(10) Patent No.: US 8,391,887 B2
(45) Date of Patent: Mar. 5, 2013

(54) METHODS AND APPARATUS TO ACTIVATE LOCATION MEASUREMENTS

(75) Inventors: Takashi Suzuki, Ichikawa (JP); Zhijun Cai, Euless, TX (US)

(73) Assignee: Research In Motion Limited, Waterloo (CA)

( * ) Notice: Subject to any disclaimer, the term of this patent is extended or adjusted under 35 U.S.C. 154(b) by 96 days.

(21) Appl. No.: 12/856,355

(22) Filed: Aug. 13, 2010

(65) Prior Publication Data

US 2012/0039365 A1  Feb. 16, 2012

(51) Int. Cl.
*H04W 24/00* (2009.01)

(52) U.S. Cl. ............... 455/456.1; 455/456.2; 455/456.3; 455/456.4; 455/456.5; 455/456.6; 455/457; 455/404.2; 455/115; 455/161.1; 370/252; 370/310; 370/328; 370/331; 370/333

(58) Field of Classification Search ............... 455/456.1, 455/456.2, 456.3, 456.4, 456.5, 456.6, 457, 455/404.2, 41.2, 115.1–115.2, 161.1, 226.1, 455/435; 370/252, 310, 328, 331–333, 342, 370/491

See application file for complete search history.

(56) References Cited

U.S. PATENT DOCUMENTS

| | | | |
|---|---|---|---|
| 6,119,005 A | 9/2000 | Smolik | |
| 6,219,544 B1 | 4/2001 | Suutarinen | |
| 6,360,098 B1 | 3/2002 | Ganesh et al. | |
| 7,092,711 B2 | 8/2006 | Masuda et al. | |
| 7,706,135 B2 | 4/2010 | Sharp et al. | |
| 7,979,208 B2* | 7/2011 | Wang | 701/484 |
| 8,121,602 B2 | 2/2012 | Yi et al. | |
| 8,155,659 B2 | 4/2012 | Kazmi et al. | |
| 2003/0190916 A1 | 10/2003 | Celedon et al. | |
| 2006/0264179 A1* | 11/2006 | Bonneville et al. | 455/67.11 |
| 2008/0108374 A1* | 5/2008 | Xiong et al. | 455/456.6 |
| 2010/0052985 A1* | 3/2010 | Hung et al. | 342/357.13 |
| 2010/0081438 A1 | 4/2010 | Callender et al. | |
| 2010/0190488 A1 | 7/2010 | Jung et al. | |
| 2010/0208707 A1 | 8/2010 | Hamabe et al. | |
| 2010/0330921 A1* | 12/2010 | Kim et al. | 455/67.11 |
| 2012/0008506 A1* | 1/2012 | Astigarraga et al. | 370/242 |
| 2012/0039189 A1 | 2/2012 | Suzuki et al. | |

FOREIGN PATENT DOCUMENTS

| | | |
|---|---|---|
| EP | 2360961 A2 | 8/2011 |
| EP | 2360961 A3 | 11/2011 |
| WO | 0070897 | 11/2000 |
| WO | 02082120 | 10/2002 |
| WO | 2008083618 | 7/2008 |

(Continued)

OTHER PUBLICATIONS

International Searching Authority, "Search Report," issued in connection with corresponding PCT Application No. PCT/CA2011/050078, mailed on Mar. 17, 2011, (3 pages).

(Continued)

*Primary Examiner* — Kamran Afshar
*Assistant Examiner* — Yousef Rod
(74) *Attorney, Agent, or Firm* — Hanley, Flight & Zimmerman, LLC (57) ABSTRACT

Methods and apparatus to activate location measurements are disclosed. An example method disclosed herein for a wireless device to activate location measurements comprises receiving configuration information including one or more radio link failure criteria for activating a processor for performing stand-alone location measurements, and operating the processor in accordance with the configuration information.

27 Claims, 6 Drawing Sheets

FOREIGN PATENT DOCUMENTS

WO  2009056028  5/2009

OTHER PUBLICATIONS

International Searching Authority, "Written Opinion," issued in connection with corresponding PCT Application No. PCT/CA2011/050078, mailed on Mar. 17, 2011, (4 pages).

International Searching Authority, "Search Report," issued in connection with corresponding PCT Application No. PCT/CA2011/050079, mailed on Mar. 14, 2011, (3 pages).

International Searching Authority, "Written Opinion," issued in connection with corresponding PCT Application No. PCT/CA2011/050079, mailed on Mar. 14, 2011, (4 pages).

International Searching Authority, "Search Report," issued in connection with corresponding PCT Application No. PCT/CA2011/050080, mailed on Apr. 29, 2011, (3 pages).

International Searching Authority, "Written Opinion" issued in connection with corresponding PCT Application No. PCT/CA2011/050080, mailed on Apr. 29, 2011, (4 pages).

"3rd Generation Partnership Project; Technical Specification Group Radio Access Network; User Equipment (UE) procedures in idle mode and procedures for cell reselection in connected mode (Release 8)," 3GPP TS 25.304 V8.10.0, Jun. 2010 (50 pages).

"3rd Generation Partnership Project; Technical Specification Group Radio Access Network; Evolved Universal Terrestrial Radio Access (E-UTRA); User Equipment (UE) procedures in idle mode (Release 8)," 3GPP TS 36.304 V8.8.0, Dec. 2009, (30 pages).

"Support of UE-originated RLFreporting for Mobility Robustness SON use case," Change Request 36.331, CR 0401, rev 3, Current Version: 9.1.0, 3GPP TSG-WG2 Meeting #69, San Francisco, USA, Feb. 22-26, 2010, (7 pages).

NTT DOCOMO, Inc. "Positioning session as trigger for MDT measurement collection," Document for Discussion and Approval, Agenda Item: 4.3.1.3 (4.3.1.2), 3GPP TSG-RAN2#70bis; Stockholm, Sweden, Jun. 28-Jul. 2, 2010 (4 pages).

"3rd Generation Partnership Project; Technical Specification Group TSG RAN; Universal Terrestrial Radio Access (UTRA) and Evolved Universal Terrestrial Radio Access (E-UTRA); Radio measurement collection for Minimization of Drive Tests (MDT); Overall description; Stage 2; (Release 10)," Jun. 2010, (15 pages).

Surveylab, "GPS TTFF and startup modes," downloaded from http://www.ikegps.com/ on Aug. 13, 2010 (3 pages).

International Searching Authority, "International Search Report and Written Opinion," issued in connection with corresponding PCT Application No. PCT/US2011/047243, issued on Dec. 2, 2011 (12 pages).

International Searching Authority, "International Search Report and Written Opinion," issued in connection with corresponding PCT Application No. PCT/US2011/047244, issued on Nov. 16, 2011 (14 pages).

Research in Motion UK Limited, "Reporting of Neighbour Cell in Logged MDT," Document for Discussion and Decision, Agenda Item: 4.3.1.3, 3GPP TSG-RAN WG2 Meeting #71bis; Xi'an, China, Oct. 11-15, 2010 (3 pages).

ETSI MCC, "Report of 3GPP TSG RAN WG2 Meeting #71bis, held in Xi'an, China, Oct. 11-15, 2010," Document for Approval, Agenda Item: 2.2, 3GPP TSG-RAN Working Group 2 Meeting #72; Jacksonville, USA, Nov. 15-19, 2010 (144 pages).

"3rd Generation Partnership Project; Technical Specification Group Radio Access Network; Study on Minimization of Drive-Tests in Next Generation Networks (Release 9)," 3GPP TS 36.805 V2.0.0, Nov. 2009, (23 pages).

"3rd Generation Partnership Project; Technical Specification Group Radio Access Network; Study on Minimization of Drive-Tests in Next Generation Networks (Release 9)," 3GPP TS 36.805 V2.0.0, Dec. 2009, (23 pages).

"3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10)," 3GPP TS 37.320 V0.7.0, Jun. 2010 (14 pages).

"3rd Generation Partnership Project; Technical Specification Group Radio Access Network; Universal Mobile Telecommunications System (UMTS); LTE; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10)," 3GPP TS 37.320 V10.2.0, Jul. 2011 (19 pages).

USPTO, "Office Action," issued in connection with U.S. Appl. No. 12/856,344, on Jul. 20, 2012 (9 pages).

The United States Patent and Trademark Office, Office action issued in U.S. Appl. No. 12/856,344, dated Nov. 9, 2012, 10 pages.

\* cited by examiner

METHODS AND APPARATUS TO ACTIVATE LOCATION MEASUREMENTS

FIELD OF THE DISCLOSURE

This disclosure relates generally to measurement reporting and, more particularly, to methods and apparatus to activate location measurements.

BACKGROUND

Currently, mobile communication network operators perform drive tests, often continuously or at least frequently, to collect network performance metrics. The Third Generation Partnership Project (3GPP) has begun specifying a minimization of drive test (MDT) framework in which at least some drive test measurements can be collected from commercial user equipment (UE) operating in the network, instead of requiring dedicated drive tests. Through the use of the MDT framework, the need for and number of rigorous drive tests may be reduced, which could significantly decrease network maintenance costs for operators and also decrease carbon emissions, thereby helping to protect the environment. Additionally, by reducing reliance on separate drive tests, faster optimization cycles may be achieved, thereby resulting in higher customer satisfaction. Furthermore, the MDT framework may enable operators to collect measurements from areas that are typically not accessed during drive tests (e.g. such as narrow roads, forests, private land, homes and office, etc.).

DETAILED DESCRIPTION

Methods and apparatus to activate location measurements are disclosed herein. An example method disclosed herein involves a UE receiving configuration information from a network element in a mobile communication network for configuring stand-alone location measurements to be performed by the UE (e.g., for including location information in reported MDT measurements). The configuration information received by the UE from the network element includes one or more radio link failure criteria for activating a global navigation satellite system (GNSS) processor (or other processor for performing stand-alone location measurements). The example method also involves the UE operating the GNSS processor in accordance with the configuration information.

In some examples, the one or more radio link failure criteria for activating the GNSS processor include a first specified radio link failure frequency at or above which the GNSS processor is to be activated. Additionally or alternatively, in some examples the configuration information includes one or more radio link failure criteria for deactivating the GNSS processor. In such examples, the one or more radio link failure criteria for deactivating the GNSS processor include a second specified radio link failure frequency at or below which the GNSS processor is to be deactivated. In some examples, the second specified radio link failure frequency can be different from the first specified radio link failure frequency. Furthermore, in some example, operating the GNSS processor in accordance with the configuration information involves activating the GNSS processor when a first number of radio link failures counted during a first time period is greater than or equal to the first specified radio link failure frequency, using the GNSS processor to perform a stand-alone location measurement when a subsequent radio link failure is detected after the GNSS processor is activated, and deactivating the GNSS processor when a second number of radio link failures counted during a second time period is less than or equal to the second specified radio link failure frequency.

As noted above, the MDT measurement framework enables network performance monitoring using commercial UE operating in the network, instead of requiring, or at least reducing, dedicated drive testing. To pinpoint trouble spots in the network, MDT measurements returned by a UE should include accurate location information, if possible. However, in radio link failure scenarios in which network assistance for location determination is unavailable, activating a GNSS processor (or similar positioning processor) in the UE that is capable of performing stand-alone location measurements (e.g., without network assistance) may take considerable time. This activation time may reduce the accuracy of the location measurement as the UE may move away from the trouble spot's location while the GNSS processor is being activated. At least some of the example methods and apparatus described herein can improve the accuracy of the location measurements by activating the GNSS processor before the trouble spot is reached, or on the edge of the trouble spot. Additionally, at least some of the example methods and apparatus described enable prompt deactivation of the GNSS processor as the trouble spot is being exited to thereby reduce the impact of location measurements on UE power consumption and battery life.

Figure 1:
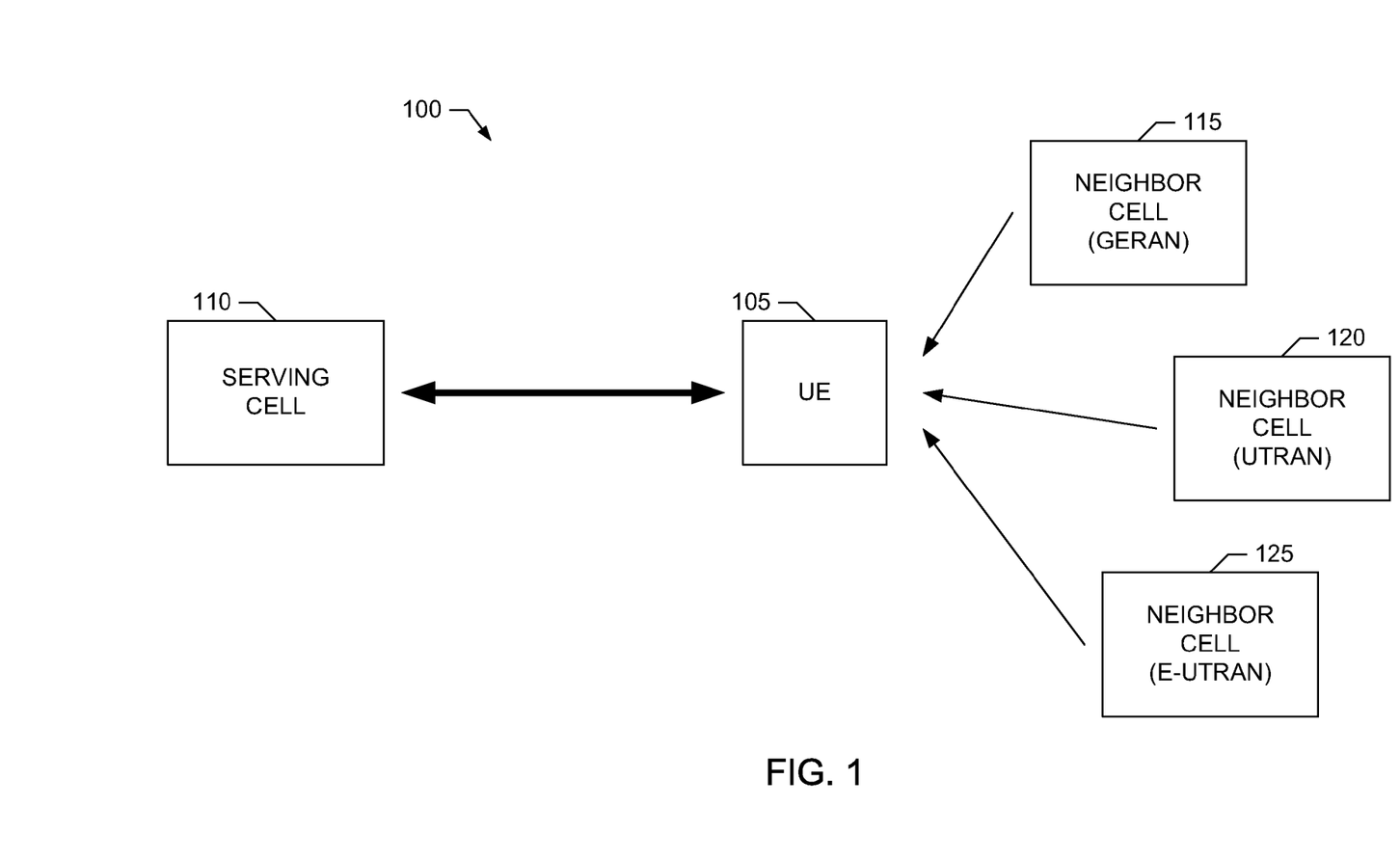
FIG. 1 is a block diagram of an example 3GPP communication system capable of supporting the methods and apparatus described herein to activate MDT location measurements.

Turning to the figures, a block diagram of an example next-generation 3GPP communication system 100 capable of supporting the MDT measurement techniques described herein is illustrated in FIG. 1. The communication system 100 includes an example UE 105 served by an example current (or home or serving) cell 110 implemented by a network element providing base station functionality, such as a node-B in a universal terrestrial radio access network (UTRAN) implementation, an evolved node-B (eNB) in an evolved UTRAN (E-UTRAN) long term evolution (LTE) implementation, etc. Additionally, the communication system 100 includes example cells 115, 120 and 125, which are neighbor cells of the current cell 110. In the illustrated example, the neighbor cells 115, 120 and 125 are implemented by one or more network elements different from the network element implementing the current cell 110. As described in greater detail below, the mobile station 105 and the network element implementing the current cell 110 implement activation of location measurements (e.g., for MDT measurement reporting) in accordance with the example methods and apparatus disclosed herein.

In the communication system 100, the UE 105 may correspond to any type of wireless device, mobile station, user endpoint equipment, user agent, etc., such as a mobile telephone device, a fixed telephone device, a personal digital assistant (PDA), a smartphone (e.g., such as BlackBerry® smartphone), etc. Each of the cells 110-125 may correspond to any type of cell, such as a GERAN cell, a UTRAN cell, an E-UTRAN cell, CDMA HRPD cell, CDMA 1xRTT cell, etc. (where GERAN refers to GSM/EDGE radio access network, GSM refers to global system for mobile communications, EDGE refers to enhanced data rates for GSM evolution, CDMA refers to code division multiple access, HRPD refers to high rate packet data and 1xRTT refers to 1× radio transmission technology as defined in the CDMA specifications). Moreover, some or all of the cells 110-125 may be the same or different types of cells. For example, in FIG. 1 the neighbor cell 115 is a GERAN cell, the neighbor cell 120 is a UTRAN cell and the neighbor cell 125 is an E-UTRAN cell. Also, although each of the cells 110-125 is depicted as being implemented by a separate network element providing base station functionality, some or all of the cells 115-125 may be implemented by a common network element. Furthermore, although only one UE 105 and four (4) cells 110-125 are illustrated in FIG. 1, the 3GPP communication system 100 can support any number of UEs 105 and cells 110-125.

In the illustrated example of FIG. 1, the UE 105 performs one or more MDT measurements as configured by the network element implementing the current cell 110. Examples of such MDT measurements include, but are not limited to, a periodic downlink pilot measurement, a serving cell becomes worse than threshold measurement, a transmit power headroom becomes less than threshold measurement, a random access failure measurement, and a radio link failure report, which are described in 3GPP Technical Report (TR) 36.805, V2.0.0 (December 2009), which is hereby incorporated by reference in its entirety. Briefly, for the periodic downlink pilot measurement, radio environment measurements, such as Common Pilot Channel (CPICH) Received Signal Code Power (RSCP), CPICH Ec/No, Time Division Duplex (TDD) Primary Common Control Physical Channel (P-CCPCH) RSCP and Interference Signal Code Power (ISCP), Reference Signal Received Power (RSRP) and Reference Signal Received Quality (RSRQ) (e.g., in connected mode only) are logged periodically in connected mode, idle mode, or both. The configuration information for periodic downlink pilot measurements includes the specified measurement period, and the periodic downlink pilot measurement reports include the radio environment measurements, as well as time and location information specifying when and where the measurement was taken, and cell identification information identifying the cell associated with a particular reported measurement. For the serving cell becomes worse than threshold measurement, radio environment measurements, such as those mentioned above, as well as location and cell identification information are logged when a measured serving cell metric becomes worse than the configured threshold. A measurement logging window (e.g., such as a "sliding window" in which collected logs are kept in the UE) is used to collect information during a certain period before and after the occurrence of event. For the transmit power headroom becomes less than threshold measurement, transmit power headroom and radio environment measurements, such as those mentioned above, as well as location and cell identification information are logged when UE transmit power headroom becomes less than the configured threshold. For the random access failure measurement, details on the random access and radio environment measurements, such as those mentioned above, as well as location and cell identification information are logged when a random access failure occurs. For the radio link failure report, radio environment measurements, such as those mentioned above, as well as location and cell identification information are reported when a radio link failure (RLF) occurs.

The 3GPP communication system 100 employs the example methods and apparatus described herein to obtain UE location information (also referred to as positioning information) for inclusion or association with MDT measurements reported by, for example, the UE 105. To reduce power impact, the example methods and apparatus attempt to activate location measurements (also referred to as positioning procedures, positioning measurements, location procedures, etc.) in the UE 105 when the UE 105 encounters a problem area or trouble spot, such as entering an area of no coverage exhibiting significant radio link failures, and deactivate the location measurements when the UE 105 recovers from the problem area. A difficulty of performing location measurements in areas of no or poor coverage, or significant radio link failures, is that the UE 105 may not be able to receive assistance from the network to perform location measurements. In such scenarios, a GNSS processor or other processor for performing stand-alone location measurements may be used by the UE 105 to perform and log location measurement with network assistance. However, activating a GNSS processor (or similar positioning processor) may take considerable time, thereby reducing the accuracy of the location measurement as the UE 105 may move away from the trouble spot's location while the GNSS processor is being activated. Additionally, activation of the GNSS processor consumes UE battery power and can reduce the battery life of the UE 105.

To attempt to ensure that GNSS processing or other location measurement processing in the UE 105 is activated and ready to perform location measurements when needed, and is deactivated when not needed, the communication system 100 configures the UE 105 with one or more radio link failure criteria for activating GNSS processing (or, more generally, any stand-alone location measurement processing) in the UE 105. In some examples, the one or more radio link failure criteria for activating GNSS processing (e.g., by activating a GNSS processor) in the UE 105 are included in MDT configuration information provided to the UE 105. For example, the one or more radio link failure criteria for activating GNSS processing can include a first specified radio link failure frequency at or above which GNSS processing in the UE 105 is to be activated. Additionally or alternatively, in some examples the MDT configuration information provided to the UE 105 includes one or more radio link failure criteria for deactivating GNSS processing (or, more generally, any stand-alone location measurement processing) in the UE 105. In such examples, the one or more radio link failure criteria for deactivating GNSS processing can include a second specified radio link failure frequency at or below which GNSS processing is to be deactivated. Furthermore, in some examples, the second specified radio link failure frequency can be different from the first specified radio link failure frequency.

The communication system 100 can employ one or more techniques for providing MDT configuration information (e.g., including the one or more radio link failure criteria for activating GNSS processing and the one or more radio link failure criteria for deactivating GNSS processing) to the UE 105. In one example, the serving cell 110 uses control plane signaling to send MDT configuration information to the UE 105. For example, in connected mode a radio resource control (RRC) connection exists between the UE 105 and the serving cell 110, and RRC messages, such as measurement control or reconfiguration messages, can be used to send the MDT configuration information from the network to the UE 105. Additionally or alternatively, MDT configuration information can be included in system information broadcast in the serving cell 110. Additionally or alternatively, the serving cell 110 can use user plane signaling to send MDT configuration information to the UE 105. For example, dynamic over-the-air configuration using one or more short message service (SMS) messages, one or more emails, one or more BlackBerry® personal identification number (PIN) messages, etc., can be used to send the MDT configuration information from the network to the UE 105. For the case of logged MDT measurements, such as logged location measurements, the MDT measurement configuration persists after the UE 105 leaves connected mode and enters idle mode, which enables to the UE 105 to perform the MDT measurements (e.g., including location measurements) during idle mode and later report the logged measurements when the UE 105 re-enters the connected state and establishes a radio connection with its serving cell (e.g., the serving cell 110). Similar to the different techniques for sending MDT configuration information to the UE 105, the UE 105 can use control plane signaling (e.g., RRC messages) and/or user plane messages (e.g., SMS messages, emails, PIN messages, etc.) to report the logged MDT measurements (e.g., including logged location measurements) to the network.

In some examples, after the UE 105 processes the MDT configuration information containing the one or more radio link failure criteria for activating GNSS processing and the one or more radio link failure criteria for deactivating GNSS processing, the UE 105 then performs GNSS processing (e.g., by operating its GNSS processor) in accordance with the MDT configuration information. For example, the UE 105 activates GNSS processing (e.g., by activating its GNSS processor) when a first number of radio link failures counted during a first time period is greater than or equal to the first specified radio link failure frequency. The UE 105 then triggers GNSS processing to perform one or more location measurement (e.g., using its activated GNSS processor) when a subsequent radio link failure is detected. In some examples, the UE 105 deactivates GNSS processing (e.g., by deactivating its GNSS processor) when a second number of radio link failures counted during a second time period is less than or equal to the second specified radio link failure frequency (which may be different from the first specified radio link failure frequency, as noted above).

Figure 2:
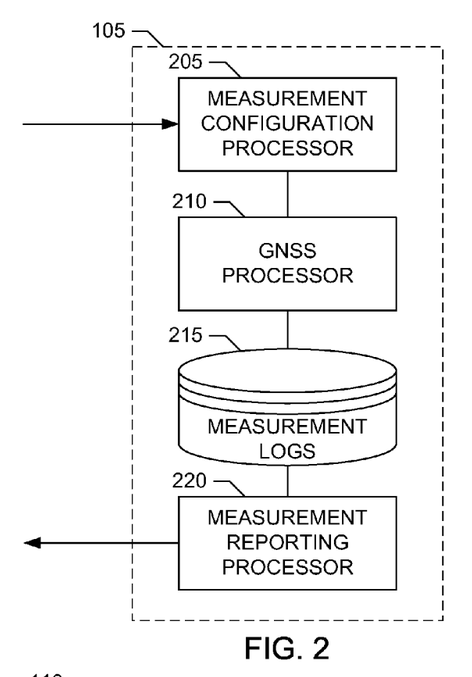
FIG. 2 is a block diagram of an example UE capable of activating MDT location measurements in the 3GPP communication system of FIG. 1 in accordance with the methods and apparatus described herein.

A block diagram of an example implementation of the UE 105 of FIG. 1 is illustrated in FIG. 2. FIG. 2 illustrates portions of the UE 105 associated with activating and performing location measurement in accordance with the example methods and apparatus described herein. Those portions of the UE 105 associated with other functionality are omitted for clarity.

Turning to FIG. 2, the illustrated example implementation of the UE 105 includes an example measurement configuration processor 205 to receive, as described above and in further detail below, MDT measurement configuration information including one or more radio link failure criteria for activating GNSS processing (e.g., by activating the GNSS processor 210) and/or one or more radio link failure criteria for deactivating GNSS processing (e.g., by deactivating the GNSS processor 210). The UE 105 of FIG. 2 also includes an example GNSS processor 210 to perform location measurements in accordance with the MDT configuration information received by the measurement configuration processor 205. The UE 105 of FIG. 2 further includes measurement logging storage 215 to log (e.g., store in a particular format) location measurement(s) determined by the GNSS processor 210 (as well as other MDT measurements determined by the UE 105). The measurement logging storage 215 can be implemented using any type of memory or storage technology, such as the volatile memory 718 and/or the mass storage device 730 of the processing system 700 illustrated in FIG. 7, which is described in greater detail below. To report the MDT measurements logged in the measurement logging storage 215 (including any logged location measurements), the UE 105 of FIG. 2 includes a measurement reporting processor 220. Example implementations and operation of the measurement configuration processor 205, the GNSS processor 210, the measurement logging storage 215 and the measurement reporting processor 220 are illustrated in subsequent figures and described in greater detail below.

Figure 3:
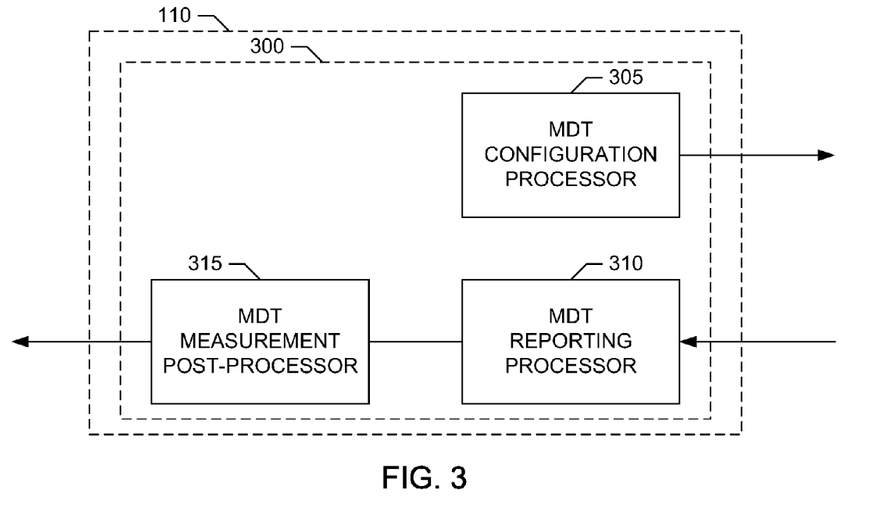
FIG. 3 is a block diagram of an example network element capable of enabling activation of MDT location measurements in the 3GPP communication system of FIG. 1 in accordance with the methods and apparatus described herein.

A block diagram of an example network element 300 that may be used by the cell 110 of FIG. 1 to configure and process location measurements is illustrated in FIG. 3. For example, the network element 300 can be implemented in or by a base station, such as a node-B or eNB, implementing the cell 110. Turning to FIG. 3, the network element 300 of the illustrated example includes an MDT configuration processor 305 to prepare and send MDT configuration information, including one or more radio link failure criteria for activating GNSS processing and/or one or more radio link failure criteria for deactivating GNSS processing, to the UE 105. The network element 300 also includes an MDT reporting processor 310 to receive MDT measurement reports/logs (e.g., including location measurements) from the UE 105 via, for example, measurement reporting, RRC signaling, etc. The network element 300 further includes an MDT measurement post-processor 315 to forward the MDT measurements/logs (e.g., including location measurements) received from one or more UEs (e.g., including the UE 105) to a network operator for further processing. Example implementations and operation of the MDT configuration processor 305, the MDT reporting processor 310 and the MDT measurement post-processor 315 are illustrated in subsequent figures and described in greater detail below.

While example manners of implementing the UE 105 and the cell 110 of FIG. 1 have been illustrated in FIGS. 2-3, one or more of the elements, processes and/or devices illustrated in FIGS. 2-3 may be combined, divided, re-arranged, omitted, eliminated and/or implemented in any other way. Further, the example measurement configuration processor 205, the example GNSS processor 210, the example measurement logging storage 215, the example measurement reporting processor 220, the example network element 300, the example MDT configuration processor 305, the example MDT reporting processor 310, the example MDT measurement post-processor 315 and/or, more generally, the example UE 105 of FIG. 2 and/or the example cell 110 of FIG. 3 may be implemented by hardware, software, firmware and/or any combination of hardware, software and/or firmware. Thus, for example, any of the example measurement configuration processor 205, the example GNSS processor 210, the example measurement logging storage 215, the example measurement reporting processor 220, the example network element 300, the example MDT configuration processor 305, the example MDT reporting processor 310, the example MDT measurement post-processor 315 and/or, more generally, the example UE 105 and/or the example cell 110 could be implemented by one or more circuit(s), programmable processor(s), application specific integrated circuit(s) (ASIC(s)), programmable logic device(s) (PLD(s)) and/or field programmable logic device(s) (FPLD(s)), etc. In at least some example implementations, at least one of the example UE 105, the example cell 110, the example measurement configuration processor 205, the example GNSS processor 210, the example measurement logging storage 215, the example measurement reporting processor 220, the example network element 300, the example MDT configuration processor 305, the example MDT reporting processor 310 and/or the example MDT measurement post-processor 315 are hereby expressly defined to include a tangible computer readable medium such as a memory, digital versatile disk (DVD), compact disk (CD), etc., storing such software and/or firmware. Further still, the example UE 105 of FIG. 2 and/or the example cell 110 of FIG. 3 may include one or more elements, processes and/or devices in addition to, or instead of, those illustrated in FIGS. 2-3, and/or may include more than one of any or all of the illustrated elements, processes and devices.

Figure 4:
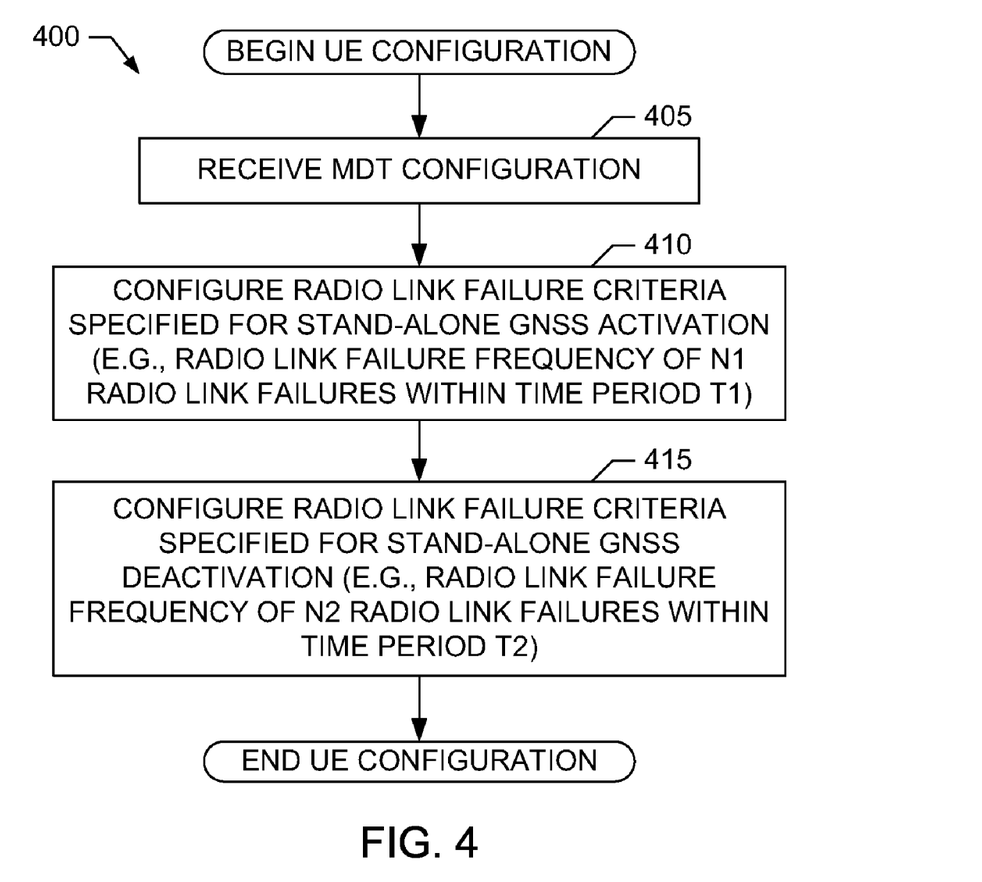
FIG. 4 is a flowchart representative of an example process that may be performed to configure activation of MDT location measurements in the UE of FIG. 2.
Figure 5:
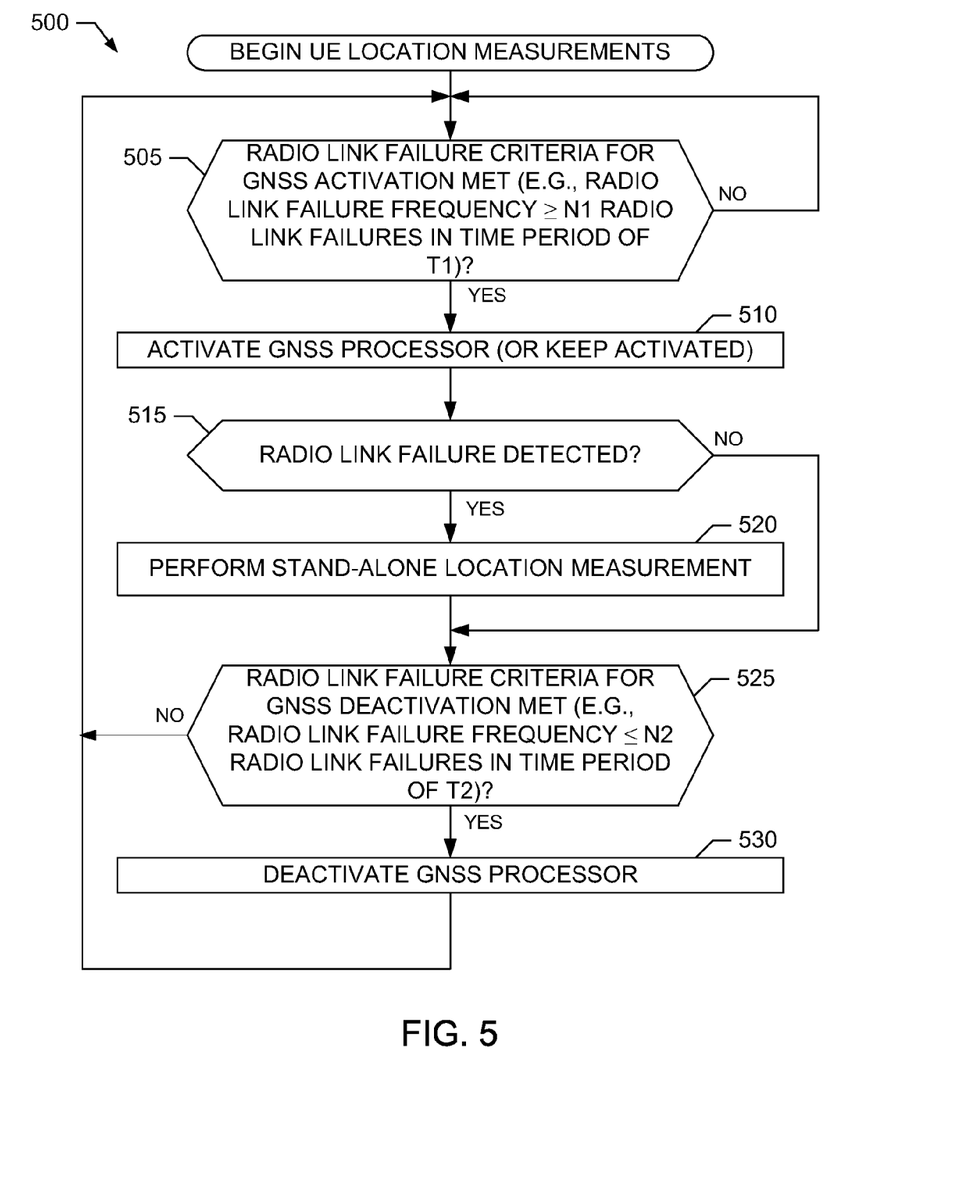
FIG. 5 is a flowchart representative of an example process that may be performed to activate MDT location measurements in the UE of FIG. 2.
Figure 6:
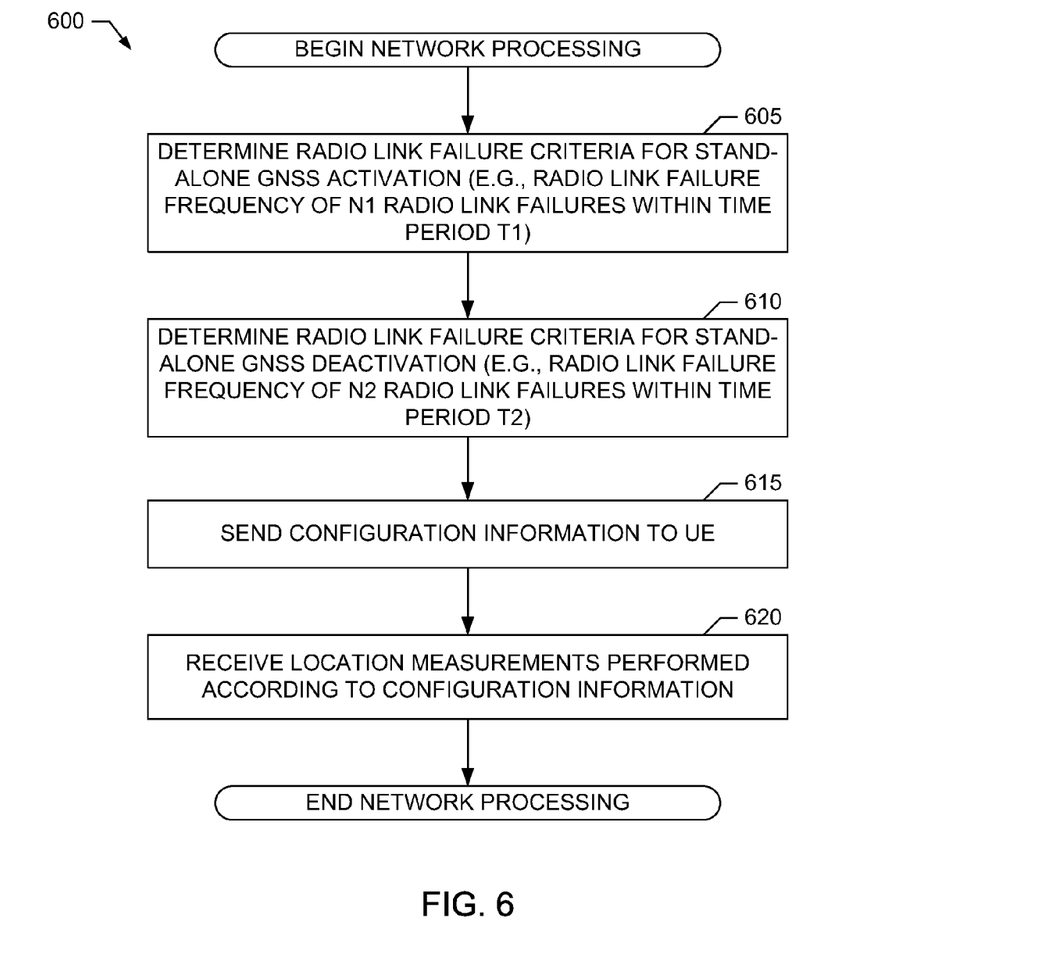
FIG. 6 is a flowchart representative of an example process that may be performed to implement MDT location activation configuration and MDT location measurement processing in the network element of FIG. 3.

Flowcharts representative of example processes that may be executed to implement the example UE 105, the example cells 110-125, the example measurement configuration processor 205, the example GNSS processor 210, the example measurement logging storage 215, the example measurement reporting processor 220, the example network element 300, the example MDT configuration processor 305, the example MDT reporting processor 310 and/or the example MDT measurement post-processor 315 are shown in FIGS. 4-6. In these examples, the process represented by each flowchart may be implemented by one or more programs comprising machine readable instructions for execution by a processor, such as the processor 712 shown in the example processing system 700 discussed below in connection with FIG. 7. Alternatively, the entire program or programs and/or portions thereof implementing one or more of the processes represented by the flowcharts of FIGS. 4-6 could be executed by a device other than the processor 712 (e.g., such as a controller and/or any other suitable device) and/or embodied in firmware or dedicated hardware (e.g., implemented by an ASIC, a PLD, an FPLD, discrete logic, etc.). Also, one or more of the processes represented by the flowchart of FIGS. 4-6, or one or more portion(s) thereof, may be implemented manually. Further, although the example processes are described with reference to the flowcharts illustrated in FIGS. 4-6, many other techniques for implementing the example methods and apparatus described herein may alternatively be used. For example, with reference to the flowcharts illustrated in FIGS. 4-6, the order of execution of the blocks may be changed, and/or some of the blocks described may be changed, eliminated, combined and/or subdivided into multiple blocks.

As mentioned above, the example processes of FIGS. 4-6 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4-6 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

An example process 400 that may be executed to implement MDT measurement configuration, including configuration of location measurement activation, in the UE 105 of FIGS. 1-2 is illustrated in FIG. 4. With reference to the preceding figures, the process 400 of FIG. 4 begins execution at block 405 at which the measurement configuration processor 205 included in the UE 105 receives MDT configuration information from its serving cell 110 via control plane signaling and/or user plane signaling, as described above. At block 410, the measurement configuration processor 205 configures one or more radio link failure criteria, provided in the MDT configuration information received at block 410, for activating GNSS processing to perform standalone location measurements. For example, at block 410 the measurement configuration processor 205 configures a first specified radio link failure frequency at or above which GNSS processing in the UE 105 is to be activated. In some examples, this first radio link failure frequency is specified in the MDT configuration information as a first number of radio link failures (e.g., N1) and a first time period (e.g., T1) during which at least the first number of radio link failures (e.g., N1) need to occur to activate GNSS processing.

At block 415, the measurement configuration processor 205 configures one or more radio link failure criteria, provided in the MDT configuration information received at block 415, for deactivating GNSS processing to stop performing standalone location measurements. For example, at block 415 the measurement configuration processor 205 configures a second specified radio link failure frequency at or below which GNSS processing in the UE 105 is to be deactivated. In some examples, this second radio link failure frequency is specified in the MDT configuration information as a second number of radio link failures (e.g., N2) and a second time period (e.g., T2) during which, if no more than the second number of radio link failures (e.g., N2) occur, then GNSS processing can be deactivated. Other example criteria/conditions for deactivating GNSS processing include, but are not limited to, expiration of a specified activation period, occurrence of a handover to another radio access technology (RAT), moving to another public land mobile network (PLMN), etc.

An example process 500 that may be executed to implement location measurement processing in the UE 105 of FIGS. 1-2 is illustrated in FIG. 5. With reference to the preceding figures, the process 500 of FIG. 5 begins execution at block 505 at which the UE 105 determines whether the radio link failure criteria for activation of GNSS processing has been met (e.g., by determining whether a first specified radio link failure frequency has been met or exceeded). If the radio link failure criteria for activation of GNSS processing has been met (block 505), then at block 510 the UE 105 activates its GNSS processor 210. In some examples, activating the GNSS processor 210 involves enabling (e.g., powering-up)

the GNSS processor 210 to attempt a location fix. After a successful location fix, the GNSS processor 210 continues to track satellites and periodically attempts subsequent located fixes so that the next location fix (e.g., when a subsequent radio link failure is detected) can be obtained with reduced latency.

In some examples, the time required for the GNSS processor 210 to be able to make location measurements after activation depends upon, for example, how much time has passed and/or how far the UE 105 has moves since the last location fix. In other words, the activation time may depend upon how recent or stale is the satellite information, timing information, etc., stored in the GNSS processor 210. In such examples, if the radio link failure criteria for activation of GNSS processing has been met, the UE 105 may further decide whether activation of the GNSS processor 210 is required at that time (e.g., because the information stored in the GNSS processor 210 is stale and, thus, the GNSS processor 210 will need to more time to perform a "cold start") or can be delayed to reduce power consumption and save battery life (e.g., because the information stored in the GNSS processor 210 is recent and the GNSS processor 210 requires less time because it can perform a "warm start" or "hot start").

Next, at block 515 the UE 105 determines whether another radio link failure has been detected. If another radio link failure has been detected (block 515), then at block 520 the UE 105 uses the GNSS processor 210 (which was activated at block 510) to perform one or more stand-alone location measurements. In some examples, if the UE 105 successfully obtains stand-alone location measurements, the UE 105 can indicate the availability of a radio link failure report containing the location information and associated neighbor cell measurement in an RRC connection setup complete message sent to the network upon reconnecting with the network after the radio link failure. The network (e.g., via a radio network controller (RNC), eNB, etc.) may retrieve the indicated radio link failure report (e.g., including the location information and neighbor cell measurements) by querying the UE 105 via, for example, the UE information request procedure. At block 525, the UE 105 determines whether the radio link failure criteria for deactivation of GNSS processing has been met (e.g., by determining whether a second specified radio link failure frequency has been met or not exceeded). If the radio link failure criteria for deactivation of GNSS processing has been met (block 525), then at block 530 the UE 105 deactivates its GNSS processor 210.

An example process 600 that may be executed to implement MDT measurement configuration and processing in the serving cell 110 of FIGS. 1 and 3 is illustrated in FIG. 6. With reference to the preceding figures, the process 600 of FIG. 6 begins execution at block 605 at which the MDT configuration processor 305 included in the network element 300 implementing the cell 110 determines the radio link failure criteria for activation of GNSS processing (e.g., as described above) to be included in the MDT configuration information to be sent to the UE 105. At block 610, the MDT configuration processor 305 determines the radio link failure criteria for deactivation of GNSS processing (e.g., as described above) to be included in the MDT configuration information to be sent to the UE 105. At block 615, the MDT configuration processor 305 sends the MDT configuration information to the UE 105. For example, the MDT configuration processor 305 can send the MDT configuration information to the UE 105 using control plane signaling (e.g., via one or more RRC messages) and/or user plane messages (e.g., SMS messages, emails, PIN messages, etc.). Sometime later, at block 620, the MDT reporting processor 310 included in the network element 300 implementing the cell 110 receives MDT measurement, including location measurements, from the UE 105 that were generated in accordance with the MDT configuration information sent at block 615.

Figure 7:
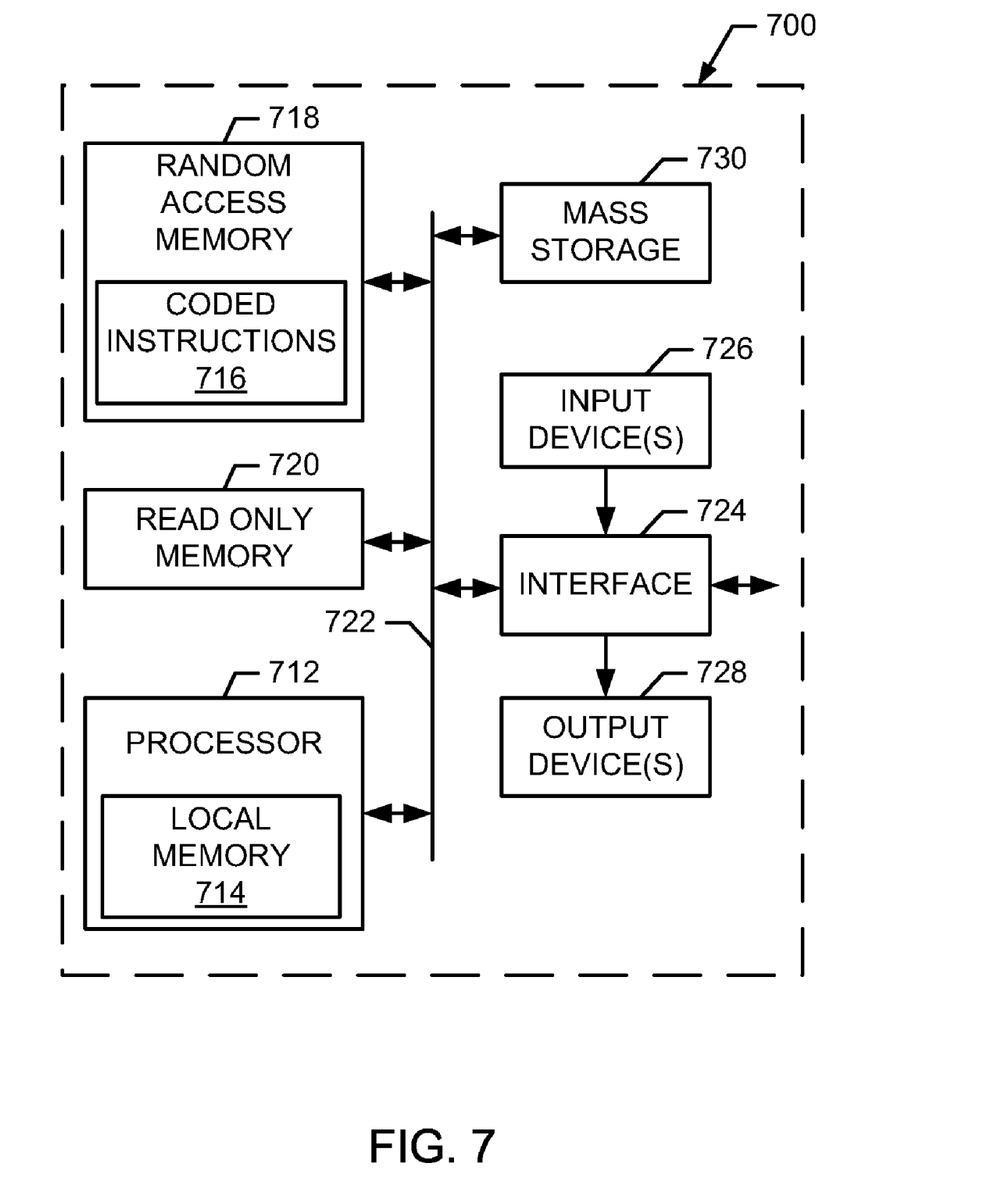
FIG. 7 is a block diagram of an example processing system that may execute example machine readable instructions used to implement some or all of the processes of FIGS. 4-6 to implement the UE of FIG. 2, the network element of FIG. 3 and/or the 3GPP communication system of FIG. 1.

FIG. 7 is a block diagram of an example processing system 700 capable of implementing the apparatus and methods disclosed herein. The processing system 700 can be, for example, a server, a personal computer, a personal digital assistant (PDA), a smartphone, an Internet appliance, a DVD player, a CD player, a digital video recorder, a personal video recorder, a set top box, or any other type of computing device.

The system 700 of the instant example includes a processor 712 such as a general purpose programmable processor. The processor 712 includes a local memory 714, and executes coded instructions 716 present in the local memory 714 and/or in another memory device. The processor 712 may execute, among other things, machine readable instructions to implement the processes represented in FIGS. 4-6. The processor 712 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 712 is in communication with a main memory including a volatile memory 718 and a non-volatile memory 720 via a bus 722. The volatile memory 718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 718, 720 is typically controlled by a memory controller (not shown).

The processing system 700 also includes an interface circuit 724. The interface circuit 724 may be implemented by any type of interface standard, such as an Ethernet interface, a universal serial bus (USB), and/or a third generation input/output (3GIO) interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, an isopoint and/or a voice recognition system.

One or more output devices 728 are also connected to the interface circuit 724. The output devices 728 can be implemented, for example, by display devices (e.g., a liquid crystal display, a cathode ray tube display (CRT)), by a printer and/or by speakers. The interface circuit 724, thus, typically includes a graphics driver card.

The interface circuit 724 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 700 also includes one or more mass storage devices 730 for storing software and data. Examples of such mass storage devices 730 include floppy disk drives, hard drive disks, compact disk drives and digital versatile disk (DVD) drives. The mass storage device 730 may implement the measurement logging storage 215. Alternatively, the volatile memory 718 may implement the measurement logging storage 215.

As an alternative to implementing the methods and/or apparatus described herein in a system such as the processing system of FIG. 7, the methods and or apparatus described herein may be embedded in a structure such as a processor and/or an ASIC (application specific integrated circuit).

In some examples, the radio link failure criteria for activating GNSS processing in the UE 105 (e.g., such as the first specified radio link failure frequency described above) and/or the radio link failure criteria for deactivating GNSS processing in the UE 105 (e.g., such as the second specified radio link failure frequency described above) can be configured in the UE 105 without being signaled by the network. In such examples, the radio link failure criteria for activating and/or deactivating GNSS processing can be predetermined in the UE 105 (e.g., via hardcoding, downloading configuration data during manufacturing, etc.).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for a wireless device to activate location measurements, the method comprising:
    receiving configuration information including one or more radio link failure criteria for activating a processor for performing stand-alone location measurements;
    operating the processor in accordance with the configuration information; and
    including a stand-alone location measurement and a cell measurement in a radio link failure report when the processor is activated based on the one or more radio link failure criteria.

2. A method as defined in claim 1 wherein the one or more radio link failure criteria for activating the processor include a specified radio link failure frequency at or above which the processor for performing stand-alone location measurements is to be activated.

3. A method as defined in claim 2 wherein the specified radio link failure frequency is specified as a number of radio link failures and a time period.

4. A method as defined in claim 1 wherein the configuration information further includes one or more radio link failure criteria for deactivating the processor.

5. A method as defined in claim 1 wherein the processor is a global navigation satellite system (GNSS) processor.

6. A method for a wireless device to activate location measurements, the method comprising:
    receiving configuration information including one or more radio link failure criteria for activating a processor for performing stand-alone location measurements; and
    operating the processor in accordance with the configuration information, wherein the one or more radio link failure criteria for activating the processor include a specified radio link failure frequency at or above which the processor for performing stand-alone location measurements is to be activated, and operating the processor in accordance with the configuration information comprises:
    activating the processor when a number of radio link failures counted during a time period is greater than or equal to the specified radio link failure frequency; and
    using the processor to perform a stand-alone location measurement when a subsequent radio link failure is detected.

7. A method for a wireless device to activate location measurements, the method comprising:
    receiving configuration information including one or more radio link failure criteria for activating a processor for performing stand-alone location measurements; and
    operating the processor in accordance with the configuration information, wherein the configuration information further includes one or more radio link failure criteria for deactivating the processor, the one or more radio link failure criteria for activating the processor include a first specified radio link failure frequency at or above which the processor for performing stand-alone location measurements is to be activated, and the one or more radio link failure criteria for deactivating the processor include a second specified radio link failure frequency at or below which the processor for performing stand-alone location measurements is to be deactivated, the second specified radio link failure frequency being different from the first specified radio link failure frequency.

8. A method as defined in claim 7 wherein operating the processor in accordance with the configuration information comprises:
    activating the processor when a first number of radio link failures counted during a first time period is greater than or equal to the first specified radio link failure frequency; and
    deactivating the processor when a second number of radio link failures counted during a second time period is less than or equal to the second specified radio link failure frequency.

9. A method as defined in claim 8 wherein operating the processor in accordance with the configuration information further comprises deactivating the processor when at least one of a specified activation period has expired, a handover to a different radio access technology (RAT) has occurred, or the processor has moved to a different public land mobile network (PLMN).

10. A method as defined in claim 7 wherein the first specified radio link failure frequency is specified as a first number of radio link failures and a first time period, and wherein the second specified radio link failure frequency is specified as a second number of radio link failures and a second time period.

11. A tangible machine readable storage medium comprising machine readable instructions which, when executed, cause a machine to at least:
    receive configuration information including one or more radio link failure criteria for activating a processor for performing stand-alone location measurements;
    operate the processor in accordance with the configuration information; and
    include a stand-alone location measurement and a cell measurement in a radio link failure report when the processor is activated based on the one or more radio link failure criteria.

12. A tangible storage medium as defined in claim 11 wherein the one or more radio link failure criteria for activating the processor include a specified radio link failure frequency at or above which the processor for performing stand-alone location measurements is to be activated.

13. A tangible storage medium as defined in claim 11 wherein the configuration information further includes one or more radio link failure criteria for deactivating the processor.

14. A tangible machine readable storage medium comprising machine readable instructions which, when executed, cause a machine to at least:

receive configuration information including one or more radio link failure criteria for activating a processor for performing stand-alone location measurements; and operate the processor in accordance with the configuration information, wherein the configuration information further includes one or more radio link failure criteria for deactivating the processor, the one or more radio link failure criteria for activating the processor include a first specified radio link failure frequency at or above which the processor for performing stand-alone location measurements is to be activated, and the one or more radio link failure criteria for deactivating the processor include a second specified radio link failure frequency at or below which the processor for performing stand-alone location measurements is to be deactivated, the second specified radio link failure frequency being different from the first specified radio link failure frequency.

15. A tangible storage medium as defined in claim 14 wherein the machine readable instructions, when executed, further cause the machine to:

activate the processor when a first number of radio link failures counted during a first time period is greater than or equal to the first specified radio link failure frequency;

use the processor to perform a stand-alone location measurement when a subsequent radio link failure is detected after the processor is activated; and deactivate the processor when a second number of radio link failures counted during a second time period is less than or equal to the second specified radio link failure frequency.

16. A tangible storage medium as defined in claim 14 wherein the machine readable instructions, when executed, further cause the machine to:

activate the processor when a first number of radio link failures counted during a first time period is greater than or equal to the first specified radio link failure frequency; and deactivate the processor when a second number of radio link failures counted during a second time period is less than or equal to the second specified radio link failure frequency.

17. A tangible storage medium as defined in claim 16 wherein the machine readable instructions, when executed, further cause the machine to deactivate the processor when at least one of a specified activation period has expired, a handover to a different radio access technology (RAT) has occurred, or the processor has moved to a different public land mobile network (PLMN).

18. A tangible storage medium as defined in claim 14 wherein the first specified radio link failure frequency is specified as a first number of radio link failures and a first time period, and the second specified radio link failure frequency is specified as a second number of radio link failures and a second time period.

19. An apparatus to activate location measurements, the apparatus comprising:

a first processor to:
receive configuration information including one or more radio link failure criteria for activating a global navigation satellite system (GNSS) processor;
operate the GNSS processor in accordance with the configuration information; and
include a stand-alone location measurement and a cell measurement in a radio link failure report when the GNSS processor is activated based on the one or more radio link failure criteria; and a memory to store location measurements determined by the GNSS processor.

20. An apparatus as defined in claim 19 wherein the one or more radio link failure criteria for activating the GNSS processor include a specified radio link failure frequency at or above which the GNSS processor is to be activated.

21. An apparatus as defined in claim 19 wherein the configuration information further includes one or more radio link failure criteria for deactivating the GNSS processor.

22. An apparatus to activate location measurements, the apparatus comprising:

a first processor to:
receive configuration information including one or more radio link failure criteria for activating a global navigation satellite system (GNSS) processor; and
operate the GNSS processor in accordance with the configuration information; and a memory to store location measurements determined by the GNSS processor, wherein the one or more radio link failure criteria for activating the GNSS processor include a specified radio link failure frequency at or above which the GNSS processor is to be activated, and the first processor is to:

activate the GNSS processor when a number of radio link failures counted during a time period is greater than or equal to the specified radio link failure frequency; and invoke the GNSS processor to perform a stand-alone location measurement when a subsequent radio link failure is detected.

23. An apparatus to activate location measurements, the apparatus comprising:

a first processor to:
receive configuration information including one or more radio link failure criteria for activating a global navigation satellite system (GNSS) processor; and
operate the GNSS processor in accordance with the configuration information; and a memory to store location measurements determined by the GNSS processor, wherein the configuration information further includes one or more radio link failure criteria for deactivating the GNSS processor, the one or more radio link failure criteria for activating the GNSS processor include a first specified radio link failure frequency at or above which the GNSS processor is to be activated, and the one or more radio link failure criteria for deactivating the GNSS processor include a second specified radio link failure frequency at or below which the GNSS processor is to be deactivated.

24. An apparatus as defined in claim 23 wherein the first processor is to:

activate the GNSS processor when a first number of radio link failures counted during a first time period is greater than or equal to the first specified radio link failure frequency; and deactivate the GNSS processor when a second number of radio link failures counted during a second time period is less than or equal to the second specified radio link failure frequency.

25. An apparatus as defined in claim 24 wherein the first processor is to deactivate the GNSS processor when at least one of a specified activation period has expired, a handover to a different radio access technology (RAT) has occurred, or the GNSS processor has moved to a different public land mobile network (PLMN).

26. An apparatus as defined in claim 23 wherein the first specified radio link failure frequency is specified as a first number of radio link failures and a first time period, and wherein the second specified radio link failure frequency is specified as a second number of radio link failures and a second time period.

27. A tangible machine readable storage medium comprising machine readable instructions which, when executed, cause a machine to at least:

receive configuration information including one or more radio link failure criteria for activating a processor for performing stand-alone location measurements; and operate the processor in accordance with the configuration information, wherein the one or more radio link failure criteria for activating the processor include a specified radio link failure frequency at or above which the processor for performing stand-alone location measurements is to be activated, and to operate the processor in accordance with the configuration information, the machine readable instructions, when executed, further cause the machine to:

activate the processor when a number of radio link failures counted during a time period is greater than or equal to the specified radio link failure frequency; and use the processor to perform a stand-alone location measurement when a subsequent radio link failure is detected.

* * * * *